Figure 1:
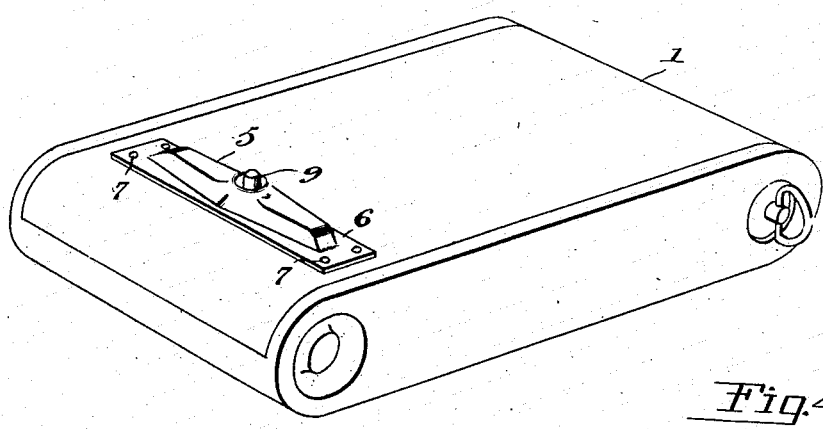

G. PELHAM.
STOP DEVICE FOR CAMERAS.
APPLICATION FILED FEB. 7, 1916.

1,213,687.

Patented Jan. 23, 1917.

Witnesses
Frederick W. Ely
Wm. R. Smith

Inventor
George Pelham
By Victor J. Evans
Attorney

UNITED STATES PATENT OFFICE.

GEORGE PELHAM, OF LEAD, SOUTH DAKOTA.

STOP DEVICE FOR CAMERAS.

1,213,687.  Specification of Letters Patent.  Patented Jan. 23, 1917.

Application filed February 7, 1916. Serial No. 76,779.

*To all whom it may concern:*

Be it known that I, GEORGE PELHAM, a citizen of the United States, residing at Lead, in the county of Lawrence and State of South Dakota, have invented new and useful Improvements in Stop Devices for Cameras, of which the following is a specification.

This invention relates to stop devices for cameras and more particularly to that type of camera using the roll film, and the invention has for its primary object to provide a device of the character specified by means of which the film may be rolled upon the spool after an exposure and accurately stopped when a new portion of the film is in position for taking a picture, thus obviating the disadvantages of having unexposed surfaces between the series of pictures.

An object of the invention is to provide a stop device automatically moved toward a position to stop winding of the film and to be manually moved to a position to allow the film to be wound, thus insuring the device operating to stop the rotation of the film when the film has been wound upon the spool a predetermined amount.

Another object of the invention is the arrangement of the openings in the film and the stopping device levers so that pressure will only have to be applied to the device momentarily by the operator for throwing the device to an inoperative position for allowing the film to be wound upon the roll and it will be held in the inoperative position by the film until a proper amount of the film has moved for the taking of another picture, then the device will automatically operate to stop the further rotation of the spool.

With these and other objects in view the invention consists in the construction, combination and arrangement of parts as will be hereinafter more fully described, illustrated in the accompanying drawing, and pointed out in the claim hereunto appended.

Similar reference characters indicate corresponding parts throughout the several views.

Figure 2:
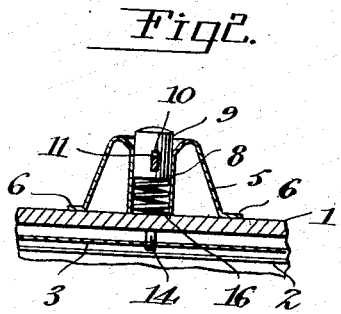
Figure 3:
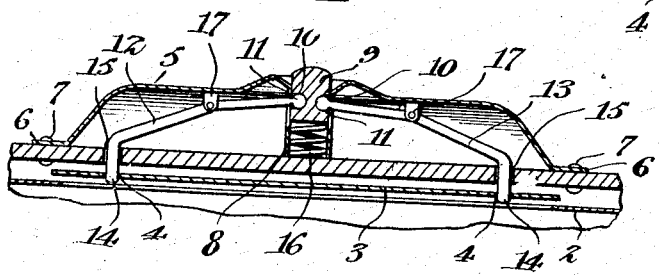
Figure 4:
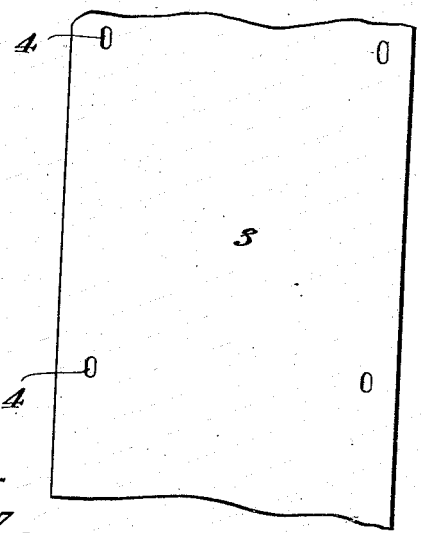

In the drawings, Figure 1 is a perspective view of the camera to which the device is attached. Fig. 2 is a longitudinal section through the camera. Fig. 3 is a cross section through the camera and Fig. 4 is a top plan view of one of the roll films showing four sets of openings.

In the drawing the numeral 1 designates a frame of a camera, while the numeral 2 designates the table over which the film travels. The roll film 3 is provided at spaced intervals adjacent its longitudinal edges with series of openings 4 spaced apart equal to the length of a picture.

My device operates transversely of the film and not lengthwise with the result that the device will not cast a shadow upon the surface of the film to be exposed.

Mounted upon the frame 1, of the camera is a casing 5 having laterally extending flanges 6 through which pass securing elements 7, the latter engaging the frame of the camera. Centrally the casing is provided with a sleeve 8 in which is slidably mounted a plunger 9, the plunger 9 is provided with diametrically arranged slots 10 in which are mounted the cylindrical headed ends 11 of two levers 12 and 13, the latter inclined in opposite directions but each having its remaining extremity bent at an angle as indicated at 14 so as to pass through the opening 15 formed in the frame of the camera and engage one of the openings 4. Thus it will be seen that when the angularly bent extremities of the levers engage the openings of the film, the film will be held against further movement, and for insuring the proper engagement between the angularly bent extremities 14 and the openings when the openings move into alinement with the angularly bent extremities 14 I provide a coil spring 16 exerting tension upon the plunger 9 at all times, each of the levers being pivoted at intermediate points to the casing as indicated at 17.

From the foregoing description it will be seen that when pressure is applied to the plunger by the operator, the angularly bent extremities 14 will be moved out of engagement with the set of openings with the result that the film is free to wind upon the spool, but immediately a new set of openings come into registration with the angular bent extremities the spring pressing upon the plunger will move the angularly bent extremities into the openings with the result that the film is held against further movement until the plunger is manually operated by the photographer.

At this point attention is called to the fact that the slots in the plunger are of greater length than the diameter of the cylindrical headed portions of the levers so that the rectilinear motion of the plunger and the curvilinear motion of the levers may be properly taken care of.

From the foregoing description taken in connection with the accompanying drawing it should be apparent that I provide a device which is admirably adapted for the purpose for which it is intended, that the device is simple, durable and efficient in operation and that the device may be manufactured and sold at a comparatively low cost.

Changes in the form, proportion and minor details of construction, may be made within the scope of the claim without departing from the spirit or sacrificing any of the advantages of the invention.

What I claim is:—

In combination a camera carrying a roll film provided with a series of openings, a casing secured to said camera, a pair of arms pivotally connected to said casing and having angularly bent extremities arranged to engage said openings, a plunger for giving arcuate movement to said levers, and a spring for opposing the movement of said plunger.

In testimony whereof I affix my signature in presence of two witnesses.

GEORGE PELHAM.

Witnesses:
J. E. CORCORAN,
MASON TYLER.

Copies of this patent may be obtained for five cents each, by addressing the "Commissioner of Patents. Washington, D. C."